United States Patent
Choi et al.

(10) Patent No.: US 7,779,467 B2
(45) Date of Patent: Aug. 17, 2010

(54) N GROUPING OF TRAFFIC AND PATTERN-FREE INTERNET WORM RESPONSE SYSTEM AND METHOD USING N GROUPING OF TRAFFIC

(75) Inventors: Daesik Choi, Daejeon (KR); Woonyon Kim, Daejeon (KR); Dongsu Kim, Daejeon (KR); Cheolwon Lee, Daejeon (KR); Eungki Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 988 days.

(21) Appl. No.: 11/542,320

(22) Filed: Oct. 2, 2006

(65) Prior Publication Data

US 2007/0150958 A1   Jun. 28, 2007

(30) Foreign Application Priority Data

Dec. 22, 2005  (KR) ............... 10-2005-0127695
May 23, 2006  (KR) ............... 10-2006-0046245

(51) Int. Cl.
*G06F 11/34* (2006.01)
*G08B 23/00* (2006.01)
*G06F 12/14* (2006.01)

(52) U.S. Cl. ............... 726/22; 726/23; 726/24; 726/25; 713/188

(58) Field of Classification Search ............. 726/22–25; 713/188
See application file for complete search history.

(56) References Cited

U.S. PATENT DOCUMENTS

2003/0097595 A1* 5/2003 Partridge et al. .......... 713/201
2004/0117648 A1* 6/2004 Kissel .................... 713/200
2006/0123482 A1* 6/2006 Aaron .................... 726/25
2006/0173992 A1* 8/2006 Weber et al. ............ 709/224

FOREIGN PATENT DOCUMENTS

KR    10200400362    4/2004

OTHER PUBLICATIONS

Chen et al. "Modeling the Spread of Active Worms" IEEE INFOCOM 2003.*
Schultz et al. "Data Mining Methods for Detection of New Malicious Executables" Proceedings of the 2001 IEEE Symposium on Security and Privacy, 2001.*

(Continued)

*Primary Examiner*—Michael J Simitoski
(74) *Attorney, Agent, or Firm*—Ladas & Parry LLP

(57) ABSTRACT

Provided are N grouping of traffic and pattern-free Internet worm response system and method. According to the method, traffic factors generated by respective worms are grouped into N groups so that a great quantity of Information may be effectively understood and a worm generated afterward is involved with characteristics of a relevant group. Damages of a network or a system predictable through already classified N traffic characteristics are defined so that corresponding step-by-step measures are taken. Characteristics of the grouped worms are quantitatively analyzed so that a danger degree of a new worm is predicted when the new worm appears afterward and forecasting and alarming through the prediction are performed. Easiness with which a controlling operator instantly understands an accident using a visualization method having an approximate real-time characteristic is increased, so that detection efficiency for most worms not detected using a conventional rule is increased.

6 Claims, 3 Drawing Sheets

OTHER PUBLICATIONS

Fox et al. "A Neural Network Approach Towards Intrusion Detection" Harris Corporation, Jul. 1990.*

"A Signal Analysis of Network Traffic Anomalies." Barford et al. ©2002 IMW, Nov. 6-8, 2002. Marseille, France, pp. 71-82.

* cited by examiner

N GROUPING OF TRAFFIC AND PATTERN-FREE INTERNET WORM RESPONSE SYSTEM AND METHOD USING N GROUPING OF TRAFFIC

BACKGROUND OF THE INVENTION

1. Field of the Invention

The present invention relates to N grouping of traffic and pattern-free Internet worm response system and method using the N grouping of traffic, and more particularly, to N grouping of traffic and pattern-free Internet worm response system and method using the N grouping of traffic, capable of properly dealing with various modifications of a worm by applying a detection method that uses results caused by the worm, getting out of a conventional method of detecting a worm through a cause of the worm.

2. Description of the Related Art

The Internet rapidly develops, causing lots of problems. One of most problematic issues is a security issue. Currently, lots of systems are exposed to an attack and intrusion. These intrusion behaviors are classified into misuse intrusion and abnormal intrusion according to types of intrusion models. A variety of intrusion detection techniques are introduced and intrusion detection systems (IDSs) having these instruction detection techniques are commercialized to deal with these intrusion behaviors, but most of them perform pattern-based detection. A pattern-free worm attack detection is still at an initial stage of concept establishment and research.

Most of the conventional approaches are occupied by a misuse intrusion detection model using a known rule, and a detection model for a pattern-free worm occupies a portion. The conventional misuse intrusion detection model is simple and has high accuracy, but cannot detect a newly generated worm or a modified worm, though modification is slight, because the conventional misuse intrusion detection model uses a known pattern. Therefore, a detection technique for a new pattern-free worm is required.

The pattern-free detection technique creates a model for a normal behavior pattern using an appropriate algorithm and automatically detects a behavior pattern that deviates from the created model. The pattern-free detection technique has an advantage of detecting even an unknown attack. When the pattern-free detection technique is used, the unknown attack can be detected but a new pattern (a behavior pattern, not an attack) that has not been studied may be detected as an attack. The pattern-free detection technique may be roughly classified into an estimation model and an explanation model. The estimation model has an object of judging whether a data set provided through studying is normal or abnormal after the normal data set for studying is provided. A technique or method that has influenced on the estimation model includes ADAM, PHAD, next-generation intrusion detection expert system (NIDES), artificial intelligence (AI), information theoretic measures, and network activity models. Unlike the estimation model, the explanation model detects an abnormal behavior pattern without any prior information regarding studied data. The explanation model is theoretically based on a statistical approach, clustering, outlier detection technique, and a state machine. Early alarming of a pattern-free worm and a countermeasure thereto are very important as a preventive measure for survival of an entire network. A support team of an Internet storm center (ISC) monitors data introduced to a database using automated analysis tool and visual tool, and explores activities that correspond to an all-out attack. The support team informs a found symptom to an Internet community via a main website of the ISC, or directly informs the found symptom to Internet service providers, new groups, or public information sharing forums through a mail or a material on a bulletin board.

However, such forecasting and alarming is by a forecast and alarm system using reports from people regarding damages rather than an automated system. Also, the forecast and alarm system generates an alarm and takes a countermeasure after attacks are made. Therefore, many improvements are required.

SUMMARY OF THE INVENTION

Accordingly, the present invention is directed to N grouping of traffic and pattern-free Internet worm response system and method, which substantially obviate one or more problems due to limitations and disadvantages of the related art.

It is an object of the present invention to provide N grouping of traffic and pattern-free Internet worm response system and method using the N grouping of traffic, capable of increasing detection efficiency for most worms not detected using a conventional rule, increasing survival characteristic of an entire communication network through a step-by-step measure, forecasting and alarming using quantitative analysis of a danger level of a concerned worm, grouping traffic factors generated by respective worms into N groups so that a great quantity of information may be effectively understood to involve a worm generated afterward with characteristics of a relevant group, defining damages of a network or a system predictable through already classified N traffic characteristics to take corresponding step-by-step measures, quantitatively analyzing characteristics of the grouped worms to predict a danger degree of a new worm when the new worm appears afterward and to perform forecasting and alarming through the prediction, and increasing easiness with which a controlling operator instantly understands an accident using a visualization method having an approximate real-time characteristic.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided N grouping of traffic and pattern-free Internet worm response method using the N grouping of traffic, the method including: grouping various worms into N groups where similar traffic factors generated by the worms are grouped; involving a worm appearing afterward with a traffic characteristic of a corresponding group defined in advance to allow a network or a system to forecast/alarm and a countermeasure of a danger of the network or system (here, N is a natural number equal to or greater than 2).

Determining of the traffic characteristic of the corresponding group defined in advance includes: executing various worms and collecting generated traffic data to perform grouping on traffic factors that generate similar results; creating N groups using the grouping results; inserting data of a real network as noises with consideration of a circumstance where noises of various communication networks and worms are generated simultaneously in a bundle; quantitatively analyzing the groups; dividing a damage influence of the quantitatively analyzed group into a plurality of hierarchies; and matching a countermeasure with each hierarchy.

The method may further include, after the inserting of data of the real network, applying a neural network algorithm to the inserted data and performing the grouping of various worms to allow the group to converge.

The controlling of the forecast/alarm and the countermeasure of the danger of the network or system may include: collecting a newly generated worm traffic using the traffic characteristic of the corresponding group defined in advance; comparing similarity of each grouped pattern with that of the newly generated worm traffic on the basis of the traffic characteristic of the corresponding group; selecting a group most similar to the grouped pattern; and performing forecast/alarming and countermeasure according to a countermeasure scheme that corresponds to the hierarchy of the group.

The comparing of the similarity may be performed using a data mining technique. Here, visualization of all operations may be performed to allow a controlling operator to easily make an immediate judgment of a correlation between the grouped pattern and a newly generated worm traffic.

In another aspect of the present invention, there is provided N grouping of traffic and pattern-free Internet worm response system using the N grouping of traffic, the system including: a traffic classification unit executing various worms, collecting generated traffic data to put together the worms having the same traffic data as collected, creating N groups where traffic factors that generate similar results are grouped, dividing a damage influence of the group into a plurality of hierarchies, and matching a countermeasure with each hierarchy and thus defining a traffic characteristic; a traffic collection unit collecting a newly generated worm traffic using the traffic characteristic of a relevant group that is defined by the traffic classification unit; and a forecast/alarm and countermeasure unit comparing similarity of each group with that of the newly generated worm traffic with reference to the traffic classification unit and making a forecast/alarm and a countermeasure according to a countermeasure scheme for each hierarchy of a most similar group (here, N is a natural number equal to or greater than 2).

The traffic classifier may include: a primitive grouping element executing various worms, collecting generated traffic data, and creating N groups using a neural network for final classification of a worm that generates a similar result; a processing grouping element inserting data of a real network as noises with consideration of a circumstance where noises and worms of various communication networks are generated simultaneously in a bundle, and applying a new neural network algorithm to allow the worms to converge to N groups; a group quantitative analysis element quantitatively analyzing the group; a hierarchy dividing element dividing a damage influence of the quantitatively analyzed group into a plurality of hierarchies; and a countermeasure matching element matching a countermeasure for a damage for each hierarchy.

The forecast/alarming and countermeasure unit comprises: a detector/comparator calculating similarities of the worm with respect to respective groups and outputting a group having greatest similarity among the calculated similarities; a seriousness judgment part monitoring a seriousness degree of the group output from the detector/comparator, calculating a degree of similarity of the relevant group, and mapping the group to hierarchy defined in advance to output a corresponding countermeasure; and a countermeasure/alarming part providing forecast/alarming and countermeasure according to damage and countermeasure guides defined in advance with reference to the countermeasure output from the seriousness judgment part.

The system may further include a traffic integration unit collecting, from the traffic collection unit connected to an end of a network, traffic data including an IP (Internet protocol), a source port number, a destination IP address, a destination port number, a size of a protocol packet, a time stamp, and a flag, and integrating all traffic data every predetermined period.

The system may further include an attack visualization part visualizing a circumstance in order to deliver similarity of each group to a controlling operator in real time with reference to the detector/comparator and the countermeasure/alarming part and thus help the controlling operator flexibly taking a countermeasure for an attack, and showing alarm delivery of the countermeasure/alarming part, and a countermeasure scheme.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention, are incorporated in and constitute a part of this application, illustrate embodiments of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Figure 1:
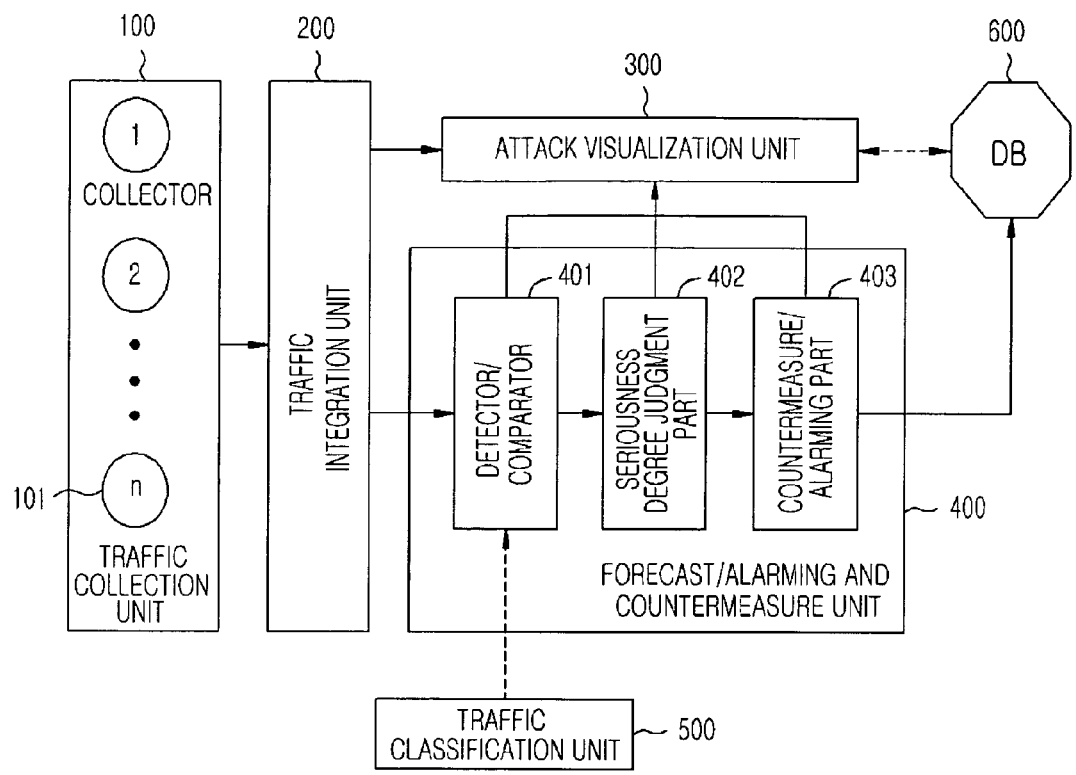
FIG. 1 is a view illustrating an entire structure of N grouping of traffic and a pattern-free Internet worm response system using the N grouping of traffic according to an embodiment of the present invention.

FIG. 1 is a view illustrating an entire structure of N grouping of traffic and a pattern-free Internet worm response system using the N grouping of traffic according to an embodiment of the present invention.

Referring to FIG. 1, the system includes a traffic collection unit 100, a traffic integration unit 200, an attack visualization unit 300, and a forecast/alarm and countermeasure unit 400, a traffic classification unit 500, and a database 600 storing related materials.

Here, the system is located in a place accessible through the Internet, and the traffic collection unit 100 is located at an entry point of each network. The forecast/alarming and countermeasure unit 400 includes a detector/comparator 401, a seriousness degree judgment part 402, and a countermeasure/alarming part 403.

The traffic collection unit 100 includes a plurality of collectors 101 and is installed at an entry point of each network to collect traffic data including an Internet protocol (IP), a source port number, a destination IP address, a destination port number, a size of a protocol packet, a time stamp, and a flag, and transmits the collected data to the traffic integration unit 200.

The traffic integration unit 200 integrates the traffic data and creates a database using the integrated traffic data for convenience when the traffic data are used afterward.

The attack visualization unit 300 matches respective grouped patterns classified by the detector/comparator 401 with newly introduced traffic information to help a controlling operator easily understand traffic change and help the countermeasure/alarming part 403 check an alarming state and a countermeasure process.

The detector/comparator 401 examines similarities of respective patterns formed by grouping a relevant worm traffic with reference to the traffic classification unit 500 to detect appearing of a pattern-free worm. Determining of the similarities is performed in the following way, in which all similarities of respective grouped patterns are displayed using a data mining method, and then delivered to the seriousness degree judgment part 402 and the attack visualization unit 300. The seriousness degree judgment part 402 selects a most similar grouped pattern to judge whether the selected pattern belongs to one of steps defined in advance, and delivers a corresponding seriousness level to the countermeasure/ alarming part 403. The countermeasure/alarming part 403 generates a countermeasure and a corresponding alarm defined suitably for each level in order to instantly deal with a damage understood in advance.

The traffic classification unit 500 performs grouping of worm traffic, stores grouped pattern data, and provides the patterns formed by grouping the worm traffic to the detector/ comparator 401.

Figure 2:
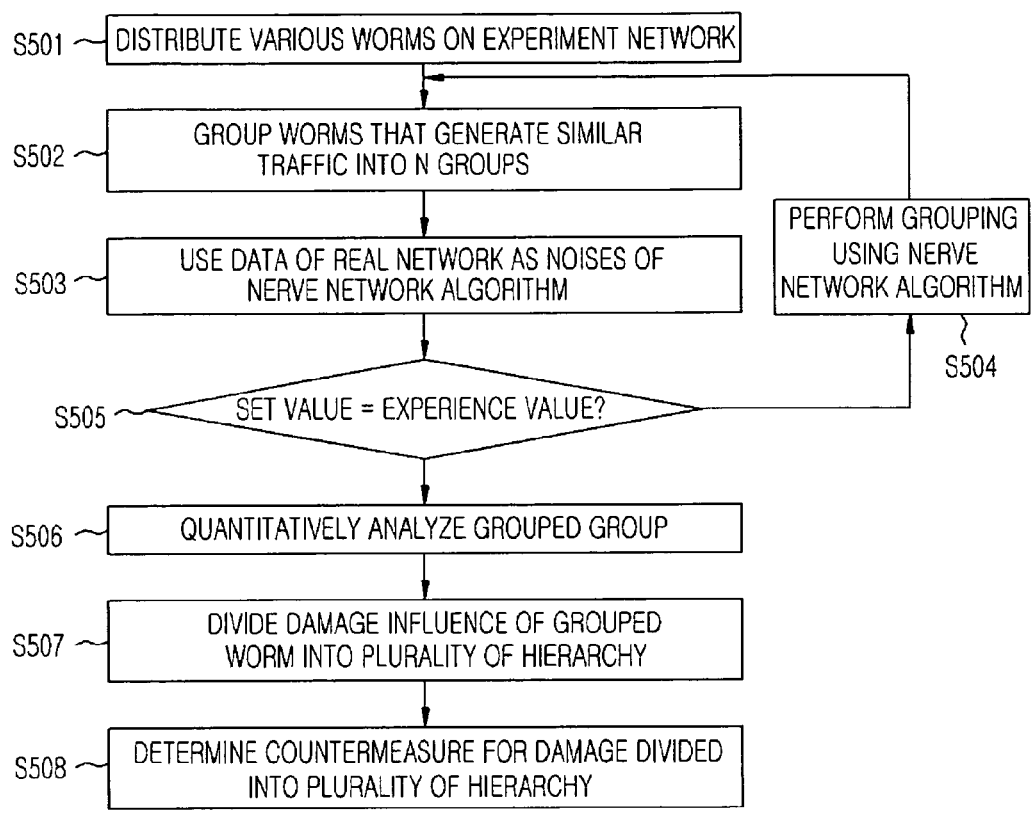
FIG. 2 is a flowchart of a grouping process by a traffic classifier used for N grouping of traffic and a pattern-free Internet worm response method using the N grouping of traffic according to an embodiment of the present invention.

FIG. 2 is a flowchart of a grouping process by a traffic classifier used for N grouping of traffic and a pattern-free Internet worm response method using the N grouping of traffic according to an embodiment of the present invention. In detail, FIG. 2 illustrates a flowchart of a process for creating a grouped pattern of various worms in order to forecast/ alarm and deal with a pattern-free worm using the above-described system.

The creation of the grouped pattern of the various worms is performed by the traffic classification unit 500, which performs studying in advance through Off-line and creates criteria that can judge similarity for a new worm and a corresponding danger degree on the basis of the studying.

For this purpose, referring to FIG. 2, after known worms having various characteristics are collected, and the worms are distributed on an experiment network installed in advance (S501), traffic data including a source IP, a source port number, a destination IP address, a destination port number, a size of a protocol packet, a time stamp, and a flag are collected and characteristics of the traffic data are understood. The worms are classified into N groups having similar results through a neural network using "results" regarding the understood characteristics (S502).

Here, the "results" element attempts to examine traffic generated by respective worms to understand characteristics of the traffic and group the traffic, and then apply the grouped traffic to a modified worm or new worm generated afterward. It is possible to create a system for comparing a tendency of the grouped classification with a tendency of a newly generated worm to detect and predict a new worm, and giving alarming and taking an appropriate measure according to intensity of the predicted attack.

On the other hand, noises are inserted into data classified into N groups in order to reflect an effect that is generated when the noises and various worms of a network are simultaneously generated (S503), and the data are classified using a neural network to converge into N groups (S504). A process of allowing the data to converge into N groups using the neural network is performed by an operator's setting. The process is performed using an experience value database (not shown) having different results for each network (S505).

Classified group is quantitatively analyzed using a variety of methods used for data mining such as a support vector machine for comparison with a newly introduced worm (S506). The classified group is divided into a plurality of hierarchy with consideration of quantitative analysis values and a damage degree for each step (S507), and a countermeasure for the considered damage degree is determined (S508).

Though not shown, to perform a grouping process of the traffic classification unit, the traffic classification unit includes: a primitive grouping element executing various worms, collecting generated traffic data, and creating N groups using a neural network for final classification of a worm that generates a similar result; a processing grouping element Inserting data of a real network as noises with consideration of a circumstance where noises and worms of various communication networks are generated simultaneously in a bundle, and applying a new neural network algorithm to allow the worms to converge to N groups; a group quantitative analysis element quantitatively analyzing the group; a hierarchy dividing element dividing a damage influence of the quantitatively analyzed group into a plurality of hierarchies; and a countermeasure matching element matching a countermeasure for a damage for each hierarchy.

Figure 3:
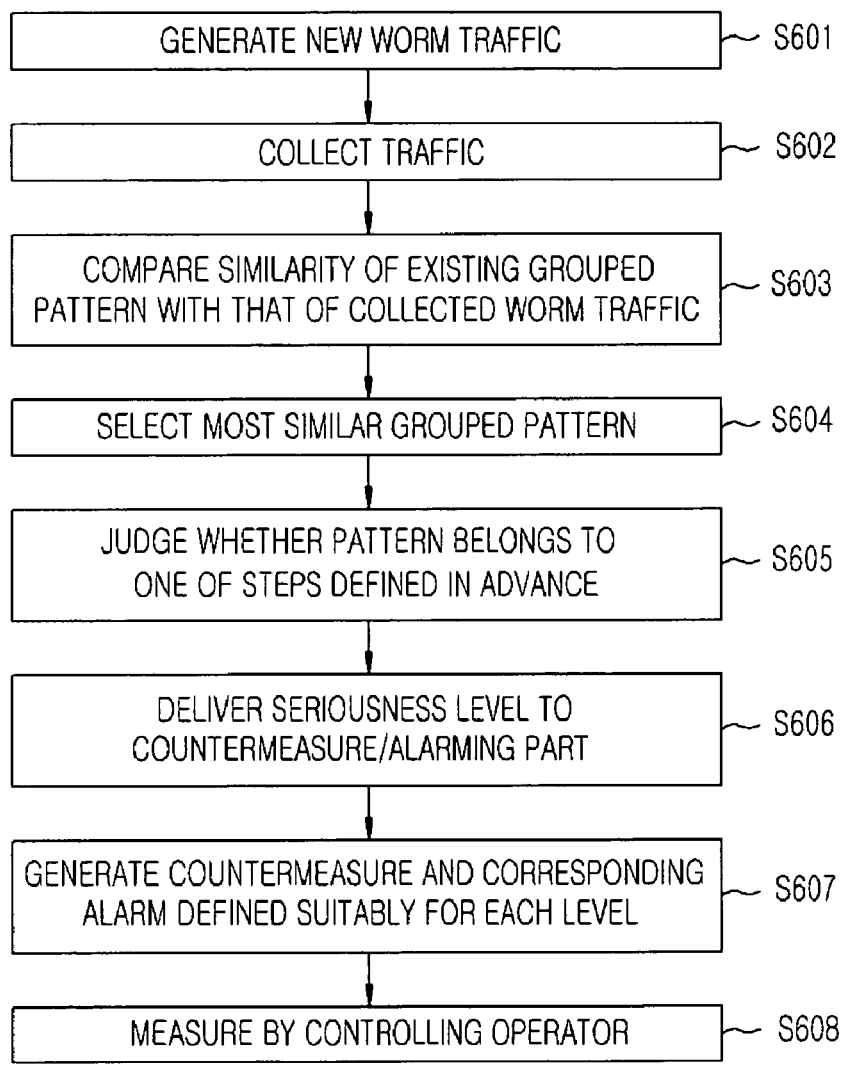
FIG. 3 is a flowchart of N grouping of traffic and a pattern-free Internet worm response method using the N grouping of traffic according to an embodiment of the present invention.

FIG. 3 is a flowchart of N grouping of traffic and a pattern-free Internet worm response method using the N grouping of traffic according to an embodiment of the present invention.

After a grouped pattern of various worms is created as illustrated in FIG. 2, the traffic collection unit 100 collects a new worm traffic (S602) and compares similarity of an existing grouped pattern provided from the traffic classification unit 500 with that of the collected worm traffic using N grouped patterns created through traffic characteristics of various Internet worms when the new worm traffic is generated (S601) as illustrated in FIG. 3 (S603). At this point, a similarity degree of the newly generated traffic with respect to respective grouped patterns is judged using a data miming technique during comparison.

The seriousness degree judgment part 402 selects a most similar grouped pattern (S604), judges whether the most similar grouped pattern belongs to one of steps defined in advance (S605), and delivers a corresponding seriousness level to the countermeasure/alarming part 403 (S606).

Next, the countermeasure/alarming part 403 generates a countermeasure and a corresponding alarm defined suitably for each level in order to instantly deal with a damage understood in advance (S607).

After that, an opportunity where a controlling operator can recognize a damage status for each alarming step and take a suitable countermeasure is prepared (S608).

Here, the respective steps S601 to S608 visualize correlation between an existing grouped pattern and newly generated worm traffic to allow a controlling operator to make an instant judgment easily.

As described above, according to N grouping of traffic and pattern-free Internet worm response system and method, a worm showing a characteristic similar to that of a group can be detected using a group classification method that uses traffic results, which are considered not to be a cause of the worm, in a reality where proper detection and countermeasure of a modified or newly generated worm are not performed. Therefore, the present invention is effective in fining out a pattern-free worm.

Also, unlike a conventional pattern-free worm detection method using existence of a worm, the present invention provides an opportunity of fining out a worm using N grouped patterns of worms. Therefore, the present invention is effective in understanding a damage status and taking a countermeasure in a made-to-order manner with respect to a worm showing a characteristic of a relevant group.

Also, the present invention can determine seriousness of a damage by a worm with respect to a corresponding group through a quantitative analysis of a classified worm and a similarity system and thus has an effect of alarming and taking a countermeasure in a made-to-order manner depending on similarity of a worm.

On the other hand, the present invention provides similarity of a worm that falls on a group using a variety of visualization methods, so that a controlling operator can easily understand a status change depending on the character of a worm.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A computerized method for N grouping of traffic and a pattern-free Internet worm response method using the N grouping of traffic, the computerized method comprising:
grouping various worms into N groups by a processor where similar traffic factors generated by the worms are grouped;
involving a worm appearing afterward with a traffic characteristic of a corresponding group defined in advance to allow a network or a system to control a forecast/alarm and a countermeasure for a danger of the network or system (here, N is a natural number equal to or greater than 2); and
wherein determining of the traffic characteristic of the corresponding group defined in advance comprises:
executing various worms and collecting generated traffic data to perform grouping on traffic factors that generate similar results;
creating N groups using the grouping results;
inserting data of a real network as noises with consideration of a circumstance where noises and worms of various communication networks are generated simultaneously in a bundle;
applying a neural network algorithm to the inserted data and performing the grouping of various worms to allow the group to converge;
quantitatively analyzing the groups;
dividing a damage influence of the quantitatively analyzed group into a plurality of hierarchies; and
matching a countermeasure with each hierarchy.

2. The computerized method of claim 1, wherein the controlling of the forecast/alarm and the countermeasure of the danger comprises:
collecting newly generated worm traffic using the traffic characteristic of the corresponding group defined in advance;
comparing similarity of each grouped pattern with that of the newly generated worm traffic on the basis of the traffic characteristic of the corresponding group;
selecting a group most similar to the grouped pattern; and
performing a forecast/alarm and a countermeasure according to a countermeasure scheme that corresponds to the hierarchy of the group.

3. The computerized method of claim 2, wherein the comparing of similarity is performed using a data mining technique.

4. The computerized method of claim 3, wherein visualization of all operations is performed to allow a controlling operator to easily make an immediate judgment of a correlation between the grouped pattern and a newly generated worm traffic.

5. N grouping of traffic and a pattern-free Internet worm response system using the N grouping of traffic, the system comprising:
a traffic classification unit on a processor executing various worms, collecting generated traffic data to put together the worms having the same traffic data as collected, creating N groups where traffic factors that generate similar results are grouped, dividing a damage influence of the group into a plurality of hierarchies, and matching a countermeasure with each hierarchy and thus defining a traffic characteristic, wherein the traffic classification unit comprises:
a primitive grouping element executing various worms, collecting generated traffic data, and creating N groups using a neural network for final classification of a worm that generates a similar result;
a processing grouping element inserting data of a real network as noises with consideration of a circumstance where noises and worms of various communication networks are generated simultaneously in a bundle, and applying a new neural network algorithm to allow the worms to converge to N groups;
a group quantitative analysis element quantitatively analyzing the groups;
a hierarchy dividing element dividing a damage influence of the quantitatively analyzed group into a plurality of hierarchies; and
a countermeasure matching element matching a countermeasure for a damage for each hierarchy;
a traffic collection unit on a processor collecting newly generated worm traffic using the traffic characteristic of a relevant group that is defined by the traffic classification unit; and
a forecast/alarm and countermeasure unit on a processor comparing similarity of each group with that of the newly generated worm traffic with reference to the traffic classification unit and making a forecast/alarm and a countermeasure according to a countermeasure scheme for each hierarchy of a most similar group (here, N is a natural number equal to or greater than 2).

6. The system of claim 5, wherein the forecast/alarm and countermeasure unit comprises:
a detector/comparator calculating similarities of the worm with respect to respective groups and outputting a group having greatest similarity among the calculated similarities;
a seriousness judgment part monitoring a seriousness degree of the group output from the detector/comparator, calculating a degree of similarity of the relevant group, and mapping the group to hierarchy defined in advance to output a corresponding countermeasure; and
a countermeasure/alarming part providing a forecast/alarm and a countermeasure according to damage and countermeasure guides defined in advance with reference to the countermeasure output from the seriousness judgment part.

* * * * *